(12) United States Patent
Sun

(10) Patent No.: US 7,212,354 B2
(45) Date of Patent: May 1, 2007

(54) LENS SYSTEM FOR DIGITAL CAMERA

(75) Inventor: Wen-Hsin Sun, Tu-Cheng (TW)

(73) Assignee: Hon Hai Precision Industry Co. Ltd, Taipei Hsien, Taiwan (CN)

(*) Notice: Subject to any disclaimer, the term of this patent is extended or adjusted under 35 U.S.C. 154(b) by 0 days.

(21) Appl. No.: 11/396,985

(22) Filed: Apr. 3, 2006

(65) Prior Publication Data

US 2006/0279855 A1    Dec. 14, 2006

(30) Foreign Application Priority Data

Jun. 8, 2005    (CN) .................... 2005 1 0035220

(51) Int. Cl.
*G02B 9/12*    (2006.01)
*G02B 3/02*    (2006.01)
(52) U.S. Cl. .................... 359/784; 359/708; 359/716
(58) Field of Classification Search ................ 359/784, 359/785, 789, 791, 792, 708, 716
See application file for complete search history.

(56) References Cited

U.S. PATENT DOCUMENTS 6,947,577 B2 *   9/2005   Stam et al. ................. 382/104
7,035,023 B2 *   4/2006   Nanba et al. ............... 359/785

* cited by examiner

*Primary Examiner*—Ricky Mack
*Assistant Examiner*—Jack Dinh
(74) *Attorney, Agent, or Firm*—Jeffrey T. Knapp

(57) ABSTRACT

A lens system (46) for a digital camera consecutively includes a first lens element (20), a second lens element (30), and a third lens element (40). The first lens element is biconvex and has a first aspheric surface (22) and an opposite second aspheric surface (24). The second lens element is concavo-convex and includes a third aspheric surface (32) and an opposite fourth aspheric surface (34). The third lens element convexo-concave and has a fifth aspheric surface (42) and an opposite sixth aspheric surface (44). The first lens element is made of glass, and the second lens element and the third lens are made of optical plastic.

20 Claims, 3 Drawing Sheets

LENS SYSTEM FOR DIGITAL CAMERA

BACKGROUND OF THE INVENTION

1. Field of the Invention

The present invention generally relates to a lens systems for devices such as digital cameras and, more particularly, to a lens system that has optical elements with aspheric surfaces.

2. Discussion of the Related Art

Digital cameras utilizing high-resolution electronic imaging sensors typically require high-resolution optical elements such as lenses. In addition, the lenses generally must be very compact, so that they can be incorporated into devices such as palm-sized computers, cellular telephones, and the like.

Lenses for digital cameras generally have a plurality of individual lens elements. The lens elements are typically spherical and so usually create spherical aberration. Chromatic aberration, coma aberration, distortion, and field curvature are also common optical aberrations that occur in the imaging process of a typical lens. A large number of lens elements are generally required in order to balance these inherent optical aberrations. Lenses having a large number of lens elements tend to be large, heavy, and expensive to manufacture. This greater manufacturing cost is caused by the added cost of assembling and mounting the lens elements into a lens barrel as well as the materials used in their construction.

Furthermore, conventional lenses commonly use one or more aspheric lens elements, each of which has one or two non-spherical surfaces. The aspheric lens elements are usually made of plastic or glass. Aspheric plastic lens elements may be produced by means of plastic injection molding and are therefore relatively inexpensive. However, the optical properties of most plastic lens elements are highly sensitive to changes in temperature and humidity, such as when the digital camera is used outdoors on very hot or cold days. On top of this, the hardness of optical plastic material is lower than that of an optical glass material, so the surfaces of such lens elements are easily scraped or abraded, which can also affect image precision. In comparison, glass aspheric lens elements have good optical properties and scratch-resistant. However, glass aspheric lenses cannot be easily produced by traditional glass grinding and polishing techniques. In addition, glass lens elements are heavier than plastic lens elements and thus defeats the goal of producing more lightweight digital cameras.

Thus it can be seen that a typical lens system has both spherical lens elements and aspheric lens elements. The lens system includes a first spherical lens element, a second spherical lens element, and a third lens element. The first lens element and the second lens element are made of glass. The third lens element has two aspheric surfaces and is made of plastic. Although the typical lens may satisfy the requirements for imaging, the resolution of the lens is low and may affect the image performance.

Accordingly, what is needed is a lens system for a digital camera which is compact and which provides good imaging quality.

SUMMARY

A lens system for a digital camera of a preferred embodiment includes a first lens element, a second lens element, and a third lens element. The first lens element is biconvex and has a first aspheric surface and a second opposite aspheric surface. The second lens element is concavo-convex and includes a third aspheric surface and an opposite fourth aspheric surface. The third lens element convexo-concave and has a fifth aspheric surface and an opposite sixth aspheric surface. The first lens element is made of glass, and the second lens element and the third lens are made of optical plastic.

Other advantages and novel features of the present lens system will become more apparent from the following detailed description thereof when taken in conjunction with the accompanying drawings.

BRIEF DESCRIPTION OF THE DRAWINGS

Many aspects of lens system can be better understood with reference to the following drawings. The components in the drawings are not necessarily to scale, the emphasis instead being placed upon clearly illustrating the principles of the present lens system. Moreover, in the drawings, like reference numerals designate corresponding parts throughout the several views.

DETAILED DESCRIPTION OF THE PREFERRED EMBODIMENT

Figure 1:
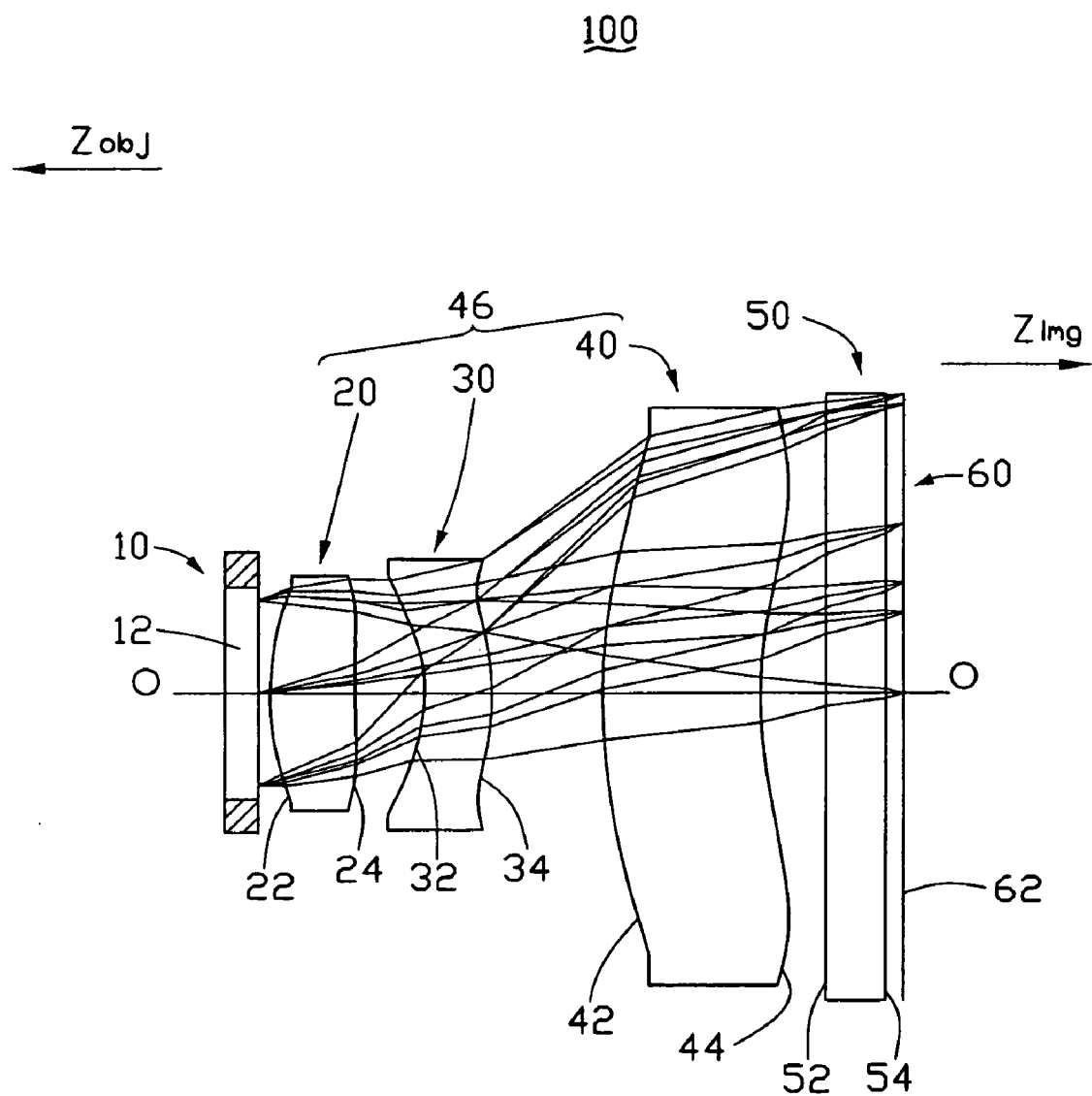
FIG. 1 is a schematic, side-on cross-sectional view of a lens system for a digital camera according to a preferred embodiment.

Referring to FIG. 1, an optical module 100 of a digital camera of a preferred embodiment includes an aperture stop 10, a first lens element 20, a second lens element 30, a third lens element 40, an optical board 50, and an imaging sensor 60, which are arranged in that order from an object side designated as "$Z_{obj}$" to an image side designated as "$Z_{img}$". The first lens element 20, the second lens element 30, and the third lens element 40 together may be considered, as a group, to constitute a lens system 46 of the optical module 100. Line OO represents an optical axis of the lens system.

The aperture stop 10 includes a stop plane 12, which faces the first lens element 20. The aperture stop 10 is the first component to receive light rays when the optical module 100 is used. Therefore, the light rays can easily be controlled using the aperture stop 10.

The first lens element 20 is biconvex and aspheric. The first lens element 20 includes a first aspheric surface 22 and an opposite second aspheric surface 24. The second lens element 30 is concavo-convex and includes a third aspheric surface 32 and an opposite fourth aspheric surface 34. The third lens element 40 is convexo-concave and includes a fifth aspheric surface 42 and an opposite sixth aspheric surface 44. The first, second, third lens elements 20, 30, 40 of the lens system 46 are symmetrically disposed in order along the optical axis OO.

The first lens element 20 is advantageously made of optical glass. A refractive index (designated as "n"), and a dispersion coefficient (designated as "v") of the first lens element 20 need to satisfy the following requirements:

1.65<n<1.75, 50<v<60. The first lens element 20 is preferably made from Glass Material K-VC80 obtainable from the Panasonic Electronic Devices Co., Ltd in Japan. The refractive index of K-VC80 is 1.69384, and its dispersion coefficient is 51.33.

The second lens element 30 is advantageously made of optical plastic since optical plastic can be more readily shaped/machined into the desired complex shape desired for the second lens element. A refractive index and a dispersion coefficient of the second lens element 30 need to satisfy the following requirements (where refractive index is designated as "n" and dispersion coefficient is designated as "v"): 1.55<n<1.65, 25<v<36. The second lens element 30 is preferably made from OKP4 obtainable from the Osaka Gas Chemicals Co., Ltd in Japan. The refractive index of OKP4 is 1.60726, and its dispersion coefficient is 26.64.

The third lens element 40 is also advantageously made of optical plastic. A refractive index and a dispersion coefficient of the optical plastic need to satisfy the following requirements (where refractive index is designated as "n", and a dispersion coefficient is designated as "v"): 1.49<n<1.55, 25<v<60. The second lens element 30 is preferably made from E48R produced by the Zeon Chemical Company in Japan. E48R is an amorphous copolymer, and is a standard grade plastic used in molded optical lenses and prisms for still cameras and video cameras. E48R has low moisture absorption, low birefringence, and high transparency The refractive index of E48R is 1.53116, and its dispersion coefficient is 56.04.

The optical board 50 is made of glass, and includes a first plane 52 and a second plane 54. The optical board 50 is preferably made from B270 obtainable from the Schott Company in Germany The refractive index of B270 is 1.52308, and its dispersion coefficient is 58.57.

At least one surface of the first lens element 20, the second lens element 30, the third lens element 40 and the optical board 50 is coated with an infrared-cut (IR-cut) coating. The IR-cut coating can filter infrared rays and hence improve image quality.

The image sensor 60 is located at an image side of the optical board 50. The image sensor 60 includes an image plane 62. The optical board 50 is used to protect the image plane 62 of the image sensor 60, so that dust or other contamination can not reach the image plane 62. The image sensor 60 is usually a Charge Coupled Device (CCD) or a Complementary Metal Oxide Semiconductor (CMOS). If the image sensor 60 is used in a digital camera of a mobile phone, the image sensor 60 is usually a CMOS for cost reasons. A pixel size of the CMOS of the present embodiment is 2.8 μm, and a resolution of the CMOS is about 1640×1240 pixels. An effective area of the CMOS is 4.592× 3.472 mm, and a length of the diagonal is 5.76 mm.

Detailed structural parameters of the preferred embodiment of the lens are shown in FIG. 1 and provided in Table 1. Surface radii and axial distances are shown in millimeters (mm). The surfaces are identified according to the corresponding drawing reference, from the object side to the image side as shown.

TABLE 1

| Surface | Description | Radius (r) | Thickness (d) | Material | Diameter | Conic (k) |
|---|---|---|---|---|---|---|
| 12 | Stop plane | ∞ | 0.05190483 | | 1.720458 | 0 |
| 22 | First aspheric surface | 2.238876 | 0.8006595 | K-VC80 | 2.035909 | 0 |
| 24 | Second aspheric surface | 41.88976 | 0.6564028 | | 2.179774 | 0 |
| 32 | Third aspheric surface | 1.425641 | 0.6360871 | OKP4 | 2.154307 | 0 |
| 34 | Fourth aspheric surface | −2.161828 | 1.053919 | | 2.521218 | 0 |
| 42 | Fifth aspheric surface | 4.75958 | 1.486146 | E48R | 4.865825 | 0 |
| 44 | Sixth aspheric surface | 3.945405 | 0.622858 | | 5.451864 | 0 |
| 52 | First plan | ∞ | 0.55 | B270 | 5.613749 | 0 |
| 54 | Second plane | ∞ | 0.1871944 | | 5.7402 | 0 |
| 62 | Image plane | ∞ | 5.806209 | | | 0 |

The aspheric surfaces are the surfaces 22, 24, 32, 34, 42 and 44, and describe the following equation:

$$z = \frac{cr^2}{1+\sqrt{1-(1+k)c^2 r^2}} + a_1 r^2 + a_2 r^4 + a_3 r^6 + a_4 r^8 + a_5 r^{10} + a_6 r^{12} \ldots$$

Where:
Z is the surface sag;
C=1/r, where r is the radius of the surface;
K is the conic constant;
r is the distance from the optical axis; and
$a_1$, $a_2$, $a_3$, $a_4$, $a_5$, and $a_6$ are the aspheric coefficients.

The aspheric coefficients $a_1$, $a_2$, $a_3$, $a_4$, $a_5$, and $a_6$ are given by Table 2:

TABLE 2

| Surface | Description | $a_1$ | $a_2$ | $a_3$ | $a_4$ | $a_5$ |
|---|---|---|---|---|---|---|
| 22 | first surface | 0 | −0.0100442617 | −0.0042088922 | 0.00086816016 | −0.0065897902 |
| 24 | second surface | 0 | −0.031802744 | −0.0093614308 | −0.0039816405 | −0.0050110589 |
| 32 | third surface | 0 | 0.072487613 | 0.056977611 | −0.018391793 | −0.0047098201 |
| 34 | fourth surface | 0 | 0.069181783 | 0.037452317 | 0.0021772689 | −0.0036464379 |
| 42 | fifth surface | 0 | −0.015033688 | 0.0025274925 | −0.00021922009 | −6.6899961e−006 |
| 44 | sixth surface | 0 | −0.022922736 | 0.0016789464 | −0.00013428379 | 2.527531e−006 |

The effective focal length of the lens is 4.817 mm in air, and the maximum aperture is f/2.8. The field of view is 61.75 degrees. The total length of the lens system 46 is 6.05 mm, and, as such, the total length thereof is advantageously less than 8 mm. The lens is well suited for use with state-of-the-art digital sensors having a resolution of about 1640×1240 pixels.

The performance of the lens of the preferred embodiment is illustrated in FIG. 2 through FIG. 5.

Figure 2:
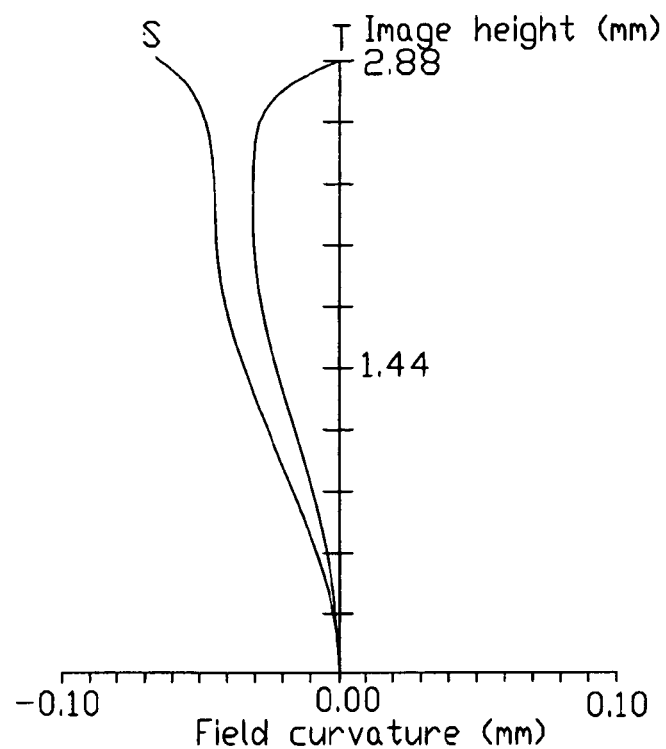
FIG. 2 is a graph showing the relationship between tangential (T) and sagittal (S) field curvatures relative to image height in millimeters in the lens system of FIG. 1.

Referring to FIG. 2, field curvature represents the curved extents of the image plane when visible light is focused through the lens. Field curvature is very seldom totally eliminated. It is not absolutely necessary to have the best correction. When cost is important, it is often wise to select a more modestly priced configuration, rather than have a high degree of correction. For the lens, it can be seen that the tangential and sagittal field curvature is under −0.1 mm.

Figure 3:
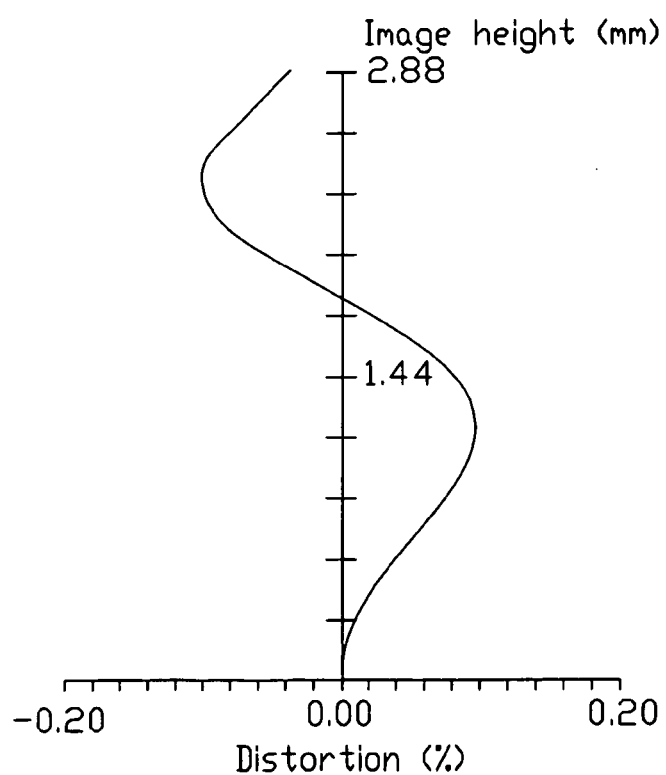
FIG. 3 is a graph of optical distortion of the lens system of FIG. 1 relative to image height in millimeters.

Referring to FIG. 3, distortion represents the inability of a lens to create a rectilinear image of the subject. Distortion does not modify the colors or the sharpness of the image, but rather the shape of the image. The maximum geometric distortion of the lens is typically higher than −1%, and lower than +1%. The lens can provide crisp and sharp images with minimal field curvature, and is sufficient for over 90 percent of photographic applications.

Figure 4:
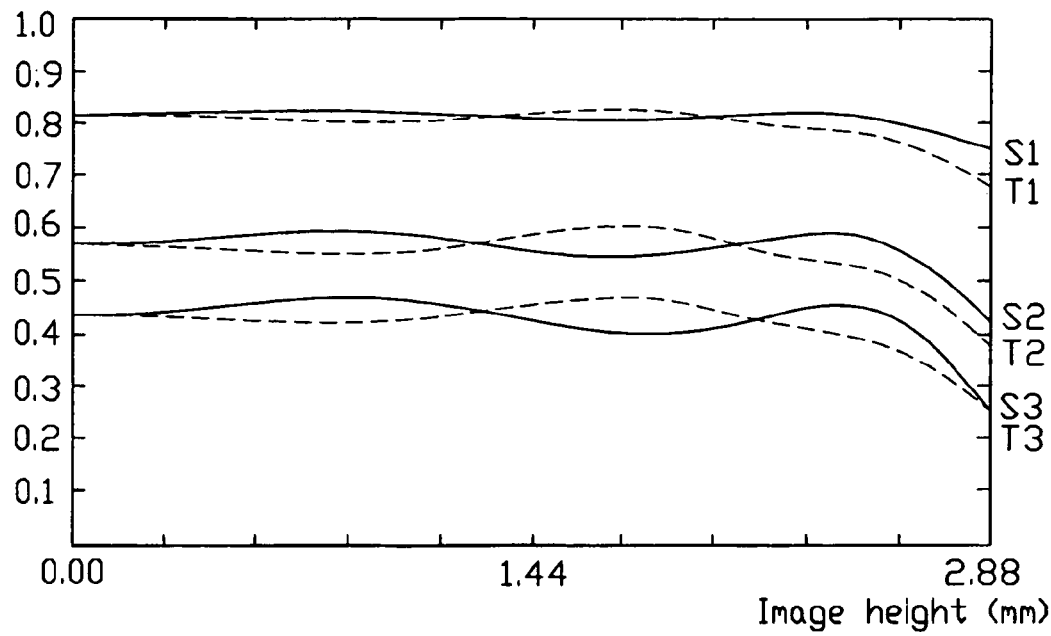
FIG. 4 is a graph of Modulation Transfer Function (MTF) of the lens system of FIG. 1 for a range of different spatial frequencies.

Referring to FIG. 4, Modulation Transfer Function (MTF) is the scientific means of evaluating the fundamental spatial resolution performance of an imaging system. When the MTF is measured, an imaging height is divided into 1.0, 0.8, 0.6, and 0 fields. The MTF is measured for each field. Each curved line represents the performance of the lens system 46. The higher the modulation transfers, the better the preservation of detail by the imaging system. The upper curved lines designated as S1,T1 represent the performance of the lens when the spatial frequency is 45 lp/mm. The middle curved lines designated as S2, T2 represent the performance of the lens when the spatial frequency is 90 lp/mm. The down curved lines designated as S3, T3 present the performance of the lens when the spatial frequency is 120 lp/mm. The higher the modulation transfers, the better the preservation of detail by the imaging system. When the spatial frequency is 120 lp/mm, the MTF is higher than 35%. This is considered satisfactory for general imaging requirements.

Figure 5:
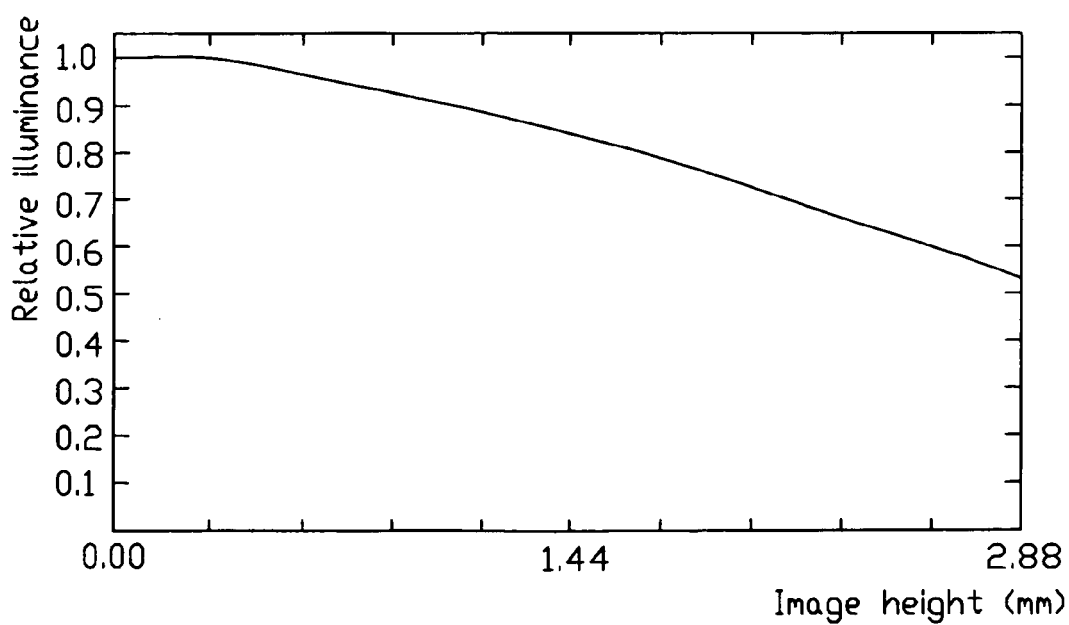
FIG. 5 is a graph showing relative illumination compared to image height in millimeters of the lens system of FIG. 1.

Referring to FIG. 5, the lowest value of the relative illumination is about 53%. Usually when the value of relative illumination is higher than 50%, it is considered satisfactory for general requirements.

The optical module 100 may be used in a variety of digital camera applications, including in personal digital cameras and other very small electronic devices.

The lens system 46 may be used in a variety of digital camera applications, including in personal digital cameras and other very small electronic devices (e.g., web cams and cameras in mobile phones).

While certain specific relationships, materials and other parameters have been detailed in the above description of preferred embodiments, the described embodiments can be varied, where suitable, within the principles of the present invention. It should be understood that the preferred embodiments have been presented by way of example only and not by way of limitation. Thus the breadth and scope of the present invention should not be limited by the above-described exemplary embodiments, but should be defined according to the following claims and their equivalents.

I claim:

1. A lens system comprising:
    a first lens element being biconvex, and including a first aspheric surface and an opposite second aspheric surface, the first lens element being made of glass, the first lens element having a refractive index n and a dispersion coefficient v which satisfy the following requirements: $1.65<n<1.75$, $50<v<60$;
    a second lens element being concavo-convex, and including a third aspheric surface and an opposite fourth aspheric surface, the third aspheric surface facing the second aspheric surface, the second lens element being made of plastic, the second lens element having a refractive index n and a dispersion coefficient v which satisfy the following requirements: $1.55<n<1.65$, $25<v<35$; and
    a third lens element being convexo-concave, and including a fifth aspheric surface and an opposite sixth aspheric surface, the fifth aspheric surface facing the fourth aspheric surface, the third lens element being made of plastic, the third lens element having a refractive index n and a dispersion coefficient v which satisfy: $1.49<n<1.55$, $55<v<60$.

2. The lens system as claimed in claim 1, wherein each of the lens elements is symmetrically disposed along an optical axis of the lens system.

3. The lens system as claimed in claim 1, wherein the first lens element is comprised of K-VC80, the refractive index n and the dispersion coefficient v of the first lens element satisfy the following requirements: $n=1.69384$, $v=51.33$.

4. The lens system as claimed in claim 1, wherein the second lens element is comprised of OKP4, the refractive index n and the dispersion coefficient v of the second lens element comprises satisfy the following requirements: $n=1.60726$, $v=26.64$.

5. The lens system as claimed in claim 1, wherein the third lens element is comprised of E48R, the refractive index n and the dispersion coefficient v of the third lens element satisfy the following requirements: $n=1.53116$, $v=56.04$.

6. The lens system as claimed in claim 1, further comprising an aperture stop disposed in front of the first lens element.

7. The lens system a as claimed in claim 1, further comprising an optical board located behind the third lens element.

8. The lens system as claimed in claim 7, wherein the optical board is coated with an infrared-cut coating.

9. The lens system as claimed in claim 1, wherein at least one surface of the first lens element, the second lens element and the third element is coated with an infrared-cut coating.

10. A module for a digital camera, comprising:
    an aperture stop;
    a lens system located behind the aperture stop, the lens system comprising:
    a plurality of lens elements including first, second and third elements, the first lens element being biconvex, and including a first aspheric surface and a second aspheric surface; the second lens element being concavo-convex, and including a third aspheric surface and a fourth aspheric surface; the third lens element being convexo-concave, and including a fifth aspheric surface and a sixth aspheric surface.
    an optical board disposed behind the third lens, and including a first plane and a second plane; and
    an image sensor, the image sensor being disposed behind the optical board and including an image plane;
    wherein the first lens element is made of glass, the second lens element and the third lens element are both made of optical plastic, the first lens element has a refractive index n and a dispersion coefficent v which satisfy: $1.65<n<1.75$, $50<v<60$.

11. The module for a digital camera as claimed in claim 10, wherein the second lens element has a refractive index n and a dispersion coefficient v which satisfy: $1.55<n<1.65$, $25<v<35$; and the third lens element has a refractive index n and a dispersion coefficient v which satisfy: $1.49<n<1.55$, $55<v<60$.

12. The lens system for a digital camera as claimed in claim 10, wherein the optical board is coated with an infrared-cut coating.

13. The lens system for a digital camera as claimed in claim 10, wherein at least one surface of the first lens element, the second lens element and the third element is coated with an infrared-cut coating.

14. An image acquiring device comprising:
   an image sensor configured for accepting light from an object of the image acquiring device to generate desired image signals for the object;
   an aperture stop disposed between the object and the image sensor so as to control an amount of the light entering the image acquiring device; and
   a lens system disposed between the aperture stop and the image sensor for treating the entering light from the aperture stop before the entering light reaches the image sensor, the lens system comprising a plurality of lens elements including first, second and third aspheric lens elements arranged in that order;
   wherein the first lens element has a refractive index in a range from 1.65 to 1.75, and a dispersion coefficient in a range from 50 to 60; the second lens element has a refractive index in a range from 1.65 to 1.75, and a dispersion coefficient in a range from 50 to 60; and the third element has a refractive index in a range from 1.49 to 1.55, and a dispersion coefficient in a range from 55 to 60.

15. The image acquiring device as claimed in claim 14, wherein the first lens element is biconvex.

16. The image acquiring device as claimed in claim 14, wherein the second lens element is concavo-convex.

17. The image acquiring device as claimed in claim 14, wherein the third lens element is convexo-concave.

18. The image acquiring device as claimed in claim 14, wherein the first lens element is made of glass, and the second lens element and the third lens are made of optical plastic.

19. The claimed in claim 14, wherein at least one surface of the first lens element, the second lens element and the third element is coated with an infrared-cut coating.

20. The image acquiring device as claimed in claim 14, wherein an effective focal length of the lens system is 4.817 mm, and a field of view of the lens system is 61.75 degrees.

* * * * *